INVENTORS
KARL V. KORDESCH
LEWIS F. URRY
BY
ATTORNEY

United States Patent Office 3,261,714
Patented July 19, 1966

3,261,714
SEALED DRY CELLS HAVING AN IONIZATION CATALYST IN THE DEPOLARIZER
Karl V. Kordesch, Lakewood, and Lewis F. Urry, Parma, Ohio, assignors to Union Carbide Corporation, a corporation of New York
Filed Jan. 7, 1963, Ser. No. 249,743
4 Claims. (Cl. 136—6)

This invention concerns primary and secondary batteries. More specifically, the invention is concerned with the elimination of excessive gas pressure in rechargeable cells.

It has long been an object of the battery industry to produce rechargeable sealed cells in which there is no formation of excessive gas pressure. This goal has been partially achieved through developments in nickel-cadmium cells and the operation of such cells on the oxygen overcharge principle. The electrodes employed in this system are so designed that only oxygen is evolved on overcharge. The oxygen thus produced oxidizes the metal anode, thus effectively reducing the gas pressure created by the oxygen evolution. While the oxygen overcharge system is advantageous in that it makes possible a sealed rechargeable battery, there are several inherent problems which limit its application. For example, the anode must be made of a material which reacts rapidly with oxygen and the cathode material is limited to compounds which do not deteriorate on repeated overcharging and which do not form soluble materials on overcharge. The materials which are required for a cell operating on the oxygen overcharge cycle are expensive. In addition, there is no efficient way of recombining the hydrogen gas generated by corrosion in the normal course of battery use.

It is an object of this invention to provide a sealed rechargeable battery which can be repeatedly discharged and recharged.

It is another object to provide a sealed rechargeable battery which is not subject to the danger of excessive gas pressure.

It is a further object to provide a sealed rechargeable battery which can be constructed with inexpensive materials.

It is a still further object to provide for the recombination of hydrogen produced by the normal corrosion which takes place within the cell.

According to the invention, these and other related objects are achieved by providing a sealed battery comprising an anode, an electrolyte, a cathode, and a high surface area porous auxiliary electrode which has been catalyzed by treatment with a hydrogen ionization catalyst, said electrode being electrically connected to the cathode. The term cathode as used herein including the appended claims is intended to include the combination of a cathode-collector and a cathodic depolarizer.

In the construction and operation of the battery, the state of charge of the anode and cathode is adjusted so that when the battery is charged, the anode reaches full capacity before the cathode is fully charged. Such a battery is conveniently referred to as being anode limited. The term "anode limited" as used herein refers to the charge capacity of the anode as compared to the charge capacity of the cathode. An anode limited cell produces only hydrogen upon overcharging.

When the anode reaches a state of full charge, the excess current produces hydrogen gas at the anode. The hydrogen gas then migrates to the catalyzed auxiliary electrode which is electrically connected to the cathode. This latter couple, i.e., the cathode and the auxiliary electrode, completes a circuit within the cell which allows the hydrogen gas to react with the cathode through the intermediate auxiliary electrode.

The auxiliary electrode which constitutes an essential element of the present invention is comprised of a porous conductive base, e.g., activated carbon or a metal which is not reactive under the conditions found in the battery, and a hydrogen ionization catalyst deposited on the surface of the porous base. A preferred base material is activated carbon having a porosity between about 25 and 35 percent which has been activated with steam or carbon dioxide at a temperature in the range of 950° C.

The hydrogen ionization catalysts which are contemplated by the present invention are selected from the platinum metals of Group VIII of the Periodic Table. Highly preferred platinum metals are platinum, rhodium, palladium, and iridium. The particular metal or combination of metals employed will depend to a large degree on the characteristics of the cell in which the auxiliary electrode is to be used. For example, platinum and iridium are preferred in lead acid cells, due to their low solubility in the electrolyte.

In the practice of the invention, the auxiliary electrode can be prepared by coating the base material with an aqueous solution of noble metal salt, e.g., a chloride, nitrate, acetate, and the like. The salt is then thermally decomposed and the metal is deposited on the surface of the base material. The decomposition can be carried out in air or in an atmosphere of hydrogen. For example, a 10 percent solution of chloroplatinic acid or of rhodium trichloride can be used to coat the base material. The coated base material then is heated to about 400° C. in a hydrogen atmosphere or to about 150 to 200° C. in air.

The auxiliary electrode may also be prepared by coating a suitable base material with a solution of a salt of the desired noble metal or metals dissolved in a mildly reducing polyhydric compound having a boiling point between 150° C. and 300° C. The admixture is then heated at a temperature above the boiling point of the polyhydric compound but below the temperature at which the base material would be damaged. The heating should be continued for a period of time sufficient to cause reduction of the salt and deposition of the catalyst on the porous base material.

Suitable polyhydric compounds are ethylene glycol, propylene glycol, diethylene glycol and triethylene glycol.

The temperature at which the reduction and deposition is carried out is generally between 190 C. and 300° C. and preferably between 250° C. and 270° C. A preferred heating period is from about 30 minutes to about 2 hours under these conditions.

Alternatively, the auxiliary electrode may be prepared by coating the base material with an aqueous solution or suspension of the noble metal salt and ammonium formate. The pH of the solution suspension should be maintained between 4 and 9 for best results. The solution is applied to the base material and then the coated substrate is heated to at least 180° C., and preferably from 240° C. to 260° C., for a period of time sufficient to allow deposition of the finely divided metal and to volatilize all remaining components of the solution. Normally a twofold excess of ammonium formate above that required to form the metal is used.

In general, the auxiliary electrode has on its surface from about 0.1 to about 10 milligrams of metal catalyst per square centimeter of surface area.

The auxiliary electrode is incorporated into the battery in such a way as to allow the hydrogen generated at the anode to contact the surface of the auxiliary electrode. If gas transfer from the anode to the auxiliary electrode must take place through the electrolyte, then it is necessary for the electrolyte to be in a gas-permeable condition. This condition may be achieved by providing a semi-wet or immobilized electrolyte, e.g., an electrolyte absorbed in a suitable bibulous material, such as kraft paper, or by gelling the electrolyte. The use of a semi-wet or immobilized electrolyte is not necessary when the design of the cell allows a free path for the gas to reach the auxiliary electrode.

The auxiliary electrode may conveniently be incorporated into the battery as a completely separate element, which is connected to the cathode by means of an electrical lead. Alternatively, the auxiliary electrode may be physically attached or joined to the battery cathode. A semi-wet or immobilized electrolyte must be used in this embodiment. In another embodiment the auxiliary electrode, in the form of a powder, may be intimately mixed with the cathode-depolarizer mix, thus providing a cathode which contains many small catalyzed auxiliary electrodes which are short circuited to the cathode. A suitable auxiliary electrode in powder form contains from about 0.1 to about 10 milligrams of metal catalyst per gram of powdered carbon.

The auxiliary electrode herein described can be used with a wide variety of galvanic systems, e.g., lead-sulfuric acid, zinc-manganese dioxide, nickel-cadmium, zinc-silver oxide, and the like.

In order to protect the anode and/or the cathode in certain systems from contact with any harmful impurities which may be leached from the catalyzed auxiliary electrode, they are surrounded by a semipermeable membrane which allows the transfer of gas and electrolyte and which is non-permeable to metal ions. Since a lead-acid cell is particularly sensitive to the presence of noble metal ions, the nature of the couple or cell must be considered when choosing a separator material. Suitable separator materials include microporous plastics such as copolymers of vinyl acetate and vinyl chloride, acrylonitrile and vinyl chloride and homopolymers and copolymers comprising vinylidene chloride; fibrous materials impregnated with insoluble resins and regenerated cellulose films.

A separator between the anode and the cathode is generally used in all galvanic cells to prevent possible electrical contact between the electrodes. However, a special separator for the specific purpose of preventing noble metal ions from contacting the electrodes is used in lead-acid batteries as both the lead and lead oxide electrodes are harmed by even small amounts of noble metal ions.

It has been found that the useful life of the battery can be considerably extended by providing an auxiliary electrode which has an electrolyte-repellent surface. For optimum operation of the batteries of the present invention, it is essential to prevent the electrolyte from flooding the pores which make up the surface of the auxiliary electrode. The auxiliary electrode may be wet-proofed by any convenient means, such as by coating the surface with a suitable hydrophobic material. For example, the electrode may be immersed in a 1½ percent solution of paraffin in petrolether, followed by air drying of the electrode.

The electrolyte-repellent condition of the auxiliary electrode can be enhanced through the use of an electrolyte having a high surface tension. For example, the surface tension of a sulfuric acid electrolyte may be increased by saturating the electrolyte with a salt such as sodium sulfate, lithium sulfate or lithium silicate.

Figure 1:
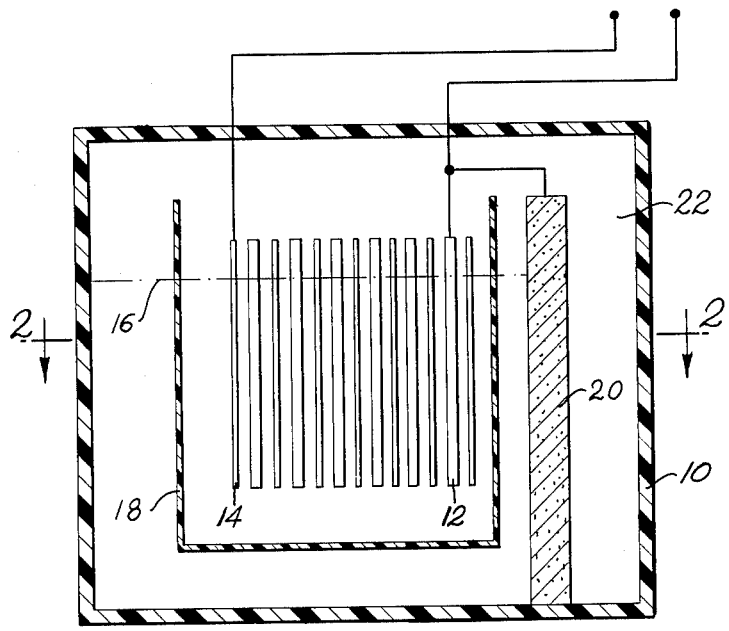
FIG. 1 is a vertical section view of a rechargeable battery embodying the invention.
Figure 2:
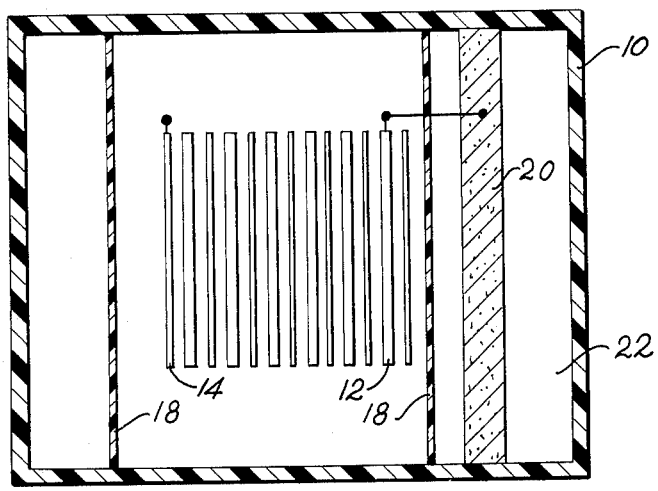
FIG. 2 is a plan view taken along the line 2—2 in FIG. 1.

Referring now to the drawing and particularly to FIG. 1, there is shown a sealed lead-acid battery embodying the invention. As shown, the battery comprises a sealed outer container 10 having therein cathodes 12 and anodes 14 which are immersed in an electrolyte 16 and surrounded by a semipermeable cellophane separator 18, and a catalyzed auxiliary electrode 20 which is also in contact with the electrolyte and being so disposed as to define a gas space 22. The auxiliary electrode 20 is electrically connected to the cathodes 12.

A lead-acid storage battery in which the electrode capacity was so adjusted as to evolve hydrogen gas when overcharged was constructed as shown in FIG. 1 and in addition was provided with a pressure gauge and then subjected to continuous charge-discharge cycling for several weeks. During this time the battery was recharged, after each discharge, with about 4 times the rated current capacity. Under ordinary conditions, this amount of charging current would have resulted in the evolution of a large volume of hydrogen and consequent rupture of the container. However, the catalyzed auxiliary electrode maintained the gas pressure inside the container at 5 pounds per square inch, or less, during the entire test period. This lack of dangerous gas pressure clearly illustrates that the hydrogen which was evolved from the electrode system was being consumed by reaction with the cathode through the medium of the auxiliary electrode.

As another example of the subject invention, a group of D-size alkaline-$MnO_2$ rechargeable cells was prepared. Half of the cells used a standard cathode mix consisting of manganese dioxide, graphite, chopped steel wool, and Portland cement. The other half of the cells were provided with an experimental cathode mix which contained, in addition to the materials of the standard mix, approximately 10 weight percent of activated, wet-proof carbon particles catalyzed with about 1 milligram of platinum per gram of carbon. All the construction features of the two groups of cells were otherwise identical.

It was found that the cells made with the experimental cathode mix could be overcharged at small current levels without buildup of excessive gas pressure while those made with the standard cathode mix developed dangerously high gas pressure. It was also found that upon shelf storage, hydrogen developed through normal corrosion was consumed in the cells which contained the catalyzed carbon material. This latter feature is of great importance to primary cells as well as secondary cells.

What is claimed is:
1. A dry cell battery comprising a sealed container, and in said container, an anode, a cathode in the form of a depolarizer mix, said cathode having a greater charge capacity than said anode, and an immobilized electrolyte in contact therebetween, said depolarizer mix comprising particles of activated carbon having coated thereon a hydrogen ionization catalyst of a platinum metal, said platinum metal catalyst being present in amounts of from about 0.1 to about 10 milligrams of metal per gram of carbon.

2. A dry cell battery as defined by claim 1 in which said particles of activated carbon are coated with a hydrophobic material.

3. A dry cell battery as defined by claim 1 in which the electrolyte is absorbed in a bibulous material disposed in contact between said anode and said depolarizer mix.

4. A dry cell battery as defined by claim 1 in which a gelled electrolyte is disposed in contact between said anode and said depolarizer mix.

References Cited by the Examiner

UNITED STATES PATENTS

| | | | |
|---|---|---|---|
| 2,131,592 | 9/1938 | Lange et al. | 136—179 |
| 3,043,896 | 7/1962 | Herbert et al. | 136—6 |
| 3,077,507 | 2/1963 | Kordesch et al. | 136—86 |
| 3,080,440 | 3/1963 | Ruetsch et al. | 136—3 |
| 3,117,033 | 1/1964 | Bachman | 136—6 |

WINSTON A. DOUGLAS, *Primary Examiner.*

MURRAY TILLMAN, *Examiner.*

B. J. OHLENDORF, *Assistant Examiner.*